United States Patent
Hashimoto

(10) Patent No.: US 8,659,779 B2
(45) Date of Patent: Feb. 25, 2014

(54) NON-TRANSITORY COMPUTER READABLE RECORDING MEDIUM STORING PRINT MANAGEMENT PROGRAM, PRINT MANAGEMENT DEVICE, PRINT MANAGEMENT METHOD, AND PRINT SYSTEM CONFIGURED FOR CAUSING A COMPUTER TO FUNCTION AS A JOB PROGRESS STATUS DISPLAY UNIT

(75) Inventor: Takahiro Hashimoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 23 days.

(21) Appl. No.: 13/368,375

(22) Filed: Feb. 8, 2012

(65) Prior Publication Data

US 2012/0218596 A1    Aug. 30, 2012

(30) Foreign Application Priority Data

Feb. 28, 2011 (JP) ................. 2011-042163

(51) Int. Cl.
*G06F 3/12* (2006.01)
(52) U.S. Cl.
USPC .......... 358/1.15; 345/440; 345/440.2
(58) Field of Classification Search
USPC .................. 358/1.1–3.29
See application file for complete search history.

(56) References Cited

U.S. PATENT DOCUMENTS

| 7,120,910 B2 | 10/2006 | Matsuda et al. |
| 2008/0180726 A1* | 7/2008 | Selvaraj ............ 358/1.15 |
| 2009/0174906 A1* | 7/2009 | Leiman et al. ............ 358/1.15 |

FOREIGN PATENT DOCUMENTS

| JP | 2007007095 A | 1/2002 |
| JP | 2005275836 A | 10/2005 |
| JP | 2006201850 A | 8/2006 |
| JP | 2007144797 A | 6/2007 |

OTHER PUBLICATIONS

Abstract of JP 2005-275836 published Oct. 6, 2005.
Abstract of JP 2007-144797 published Jun. 14, 2007.
Abstract of JP 2006-201850 published Aug. 3, 2006.
Abstract of JP 2002-007095 published Jan. 11, 2002.

* cited by examiner

*Primary Examiner* — Qian Yang
*Assistant Examiner* — Marcellus Augustin
(74) *Attorney, Agent, or Firm* — Harness, Dickey & Pierce, P.L.C.

(57) ABSTRACT

Disclosed is a non-transitory computer readable recording medium that stores a print management program causing a computer to function as a job progress status display unit that divides job progress statuses of a print job into plural categories and displays plural of the categories so that each of the categories can be selected; and a job list display unit that selects and lists first print jobs in a first job progress status from a first table that stores job progress statuses of print jobs. The job list display unit selects first functions corresponding to the first job progress status of the listed first print jobs from a second table that stores functions corresponding to the divided job progress statuses, and displays icons. Here, each of the icons accepts execution of corresponding one of the selected first functions.

6 Claims, 11 Drawing Sheets

FIG.4

| ITEM | CONTENTS |
|---|---|
| ID | JOB ID |
| Name | JOB NAME |
| Copies | NUMBER OF COPIES |
| Duplex | PRESENCE OR ABSENCE OF DUPLEX PRINTING |
| Media | PRINTING PAPER OF JOB |
| OutputBin | OUTPUT LOCATION OF JOB |
| Punch | NUMBER AND POSITIONS OF PUNCHED HOLES |
| RequestedPrinter | PRINTER TO BE REQUESTED FOR PRINTING |
| Staple | POSITION AND NUMBER OF PORTIONS TO BE STABLED |
| RetainDuration | RETENTION PERIOD OF JOB |
| Customer | CUSTOMER NAME FOR JOB |
| Description | DESCRIPTION OF JOB |
| InputDataStream | DATA FORMAT OF INPUT FILE |
| InputFileSize | SIZE OF INPUT FILE |
| TotalPages | NUMBER OF PAGES FOR JOB |
| TotalSheets | NUMBER OF SHEETS FOR JOB |
| Pages stacked | NUMBER OF PAGES THAT HAVE ALREADY BEEN OUTPUT ON STACKER |
| Sheets stacked | NUMBER OF SHEETS THAT HAVE ALREADY BEEN OUTPUT ON STACKER |
| Copies stacked | NUMBER OF COPIES THAT HAVE ALREADY BEEN OUTPUT ON STACKER |
| Cumulative pages stacked | NUMBER OF PAGES THAT HAVE ALREADY BEEN OUTPUT ON STACKER INCLUDING PAGES THAT HAVE BEEN |
| Cumulative sheets stacked | NUMBER OF SHEETS THAT HAVE ALREADY BEEN OUTPUT ON STACKER INCLUDING SHEETS THAT HAVE BEEN |
| Assigned to printer | DATE AND TIME THAT PRINTER RECEIVED JOB |
| Size | SIZE OF JOB |
| Number of reprints | NUMBER OF TIMES OF REPRINTING FOR JOB |
| Submitted | DATE AND TIME THAT JOB WAS SUBMITTED |
| Page range | RANGE OF PAGES TO BE PRINTED |
| Folding | INFORMATION ABOUT FOLDING SPECIFIED BY JOB |
| Binding | INFORMATION ABOUT BINDING SPECIFIED BY JOB |

FIG.5

| ITEM | CONTENTS |
|---|---|
| Job ID | JOB ID |
| Job Status | STATUS OF JOB |
| Progress | PROGRESS STATUS OF JOB |
| Reason for wait | REASON FOR WAITING |
| Current printer | PRINTER ACTUALLY ASSIGNED |
| Predicted printer | PRINTER SCHEDULED TO PRINT |
| Printing order | ORDER OF PRINTING |

FIG.6

| ITEM | CONTENTS |
|---|---|
| Job Status | STATUS OF JOB |
| Progress | PROGRESS STATUS OF JOB |
| Function | AVAILABLE FUNCTIONS (REPRINT, RESTART, STOP, MOVE) |
| Icon | ICONS INDICATING FUNCTIONS ( 🖨 ▬ ▲ ) |

54

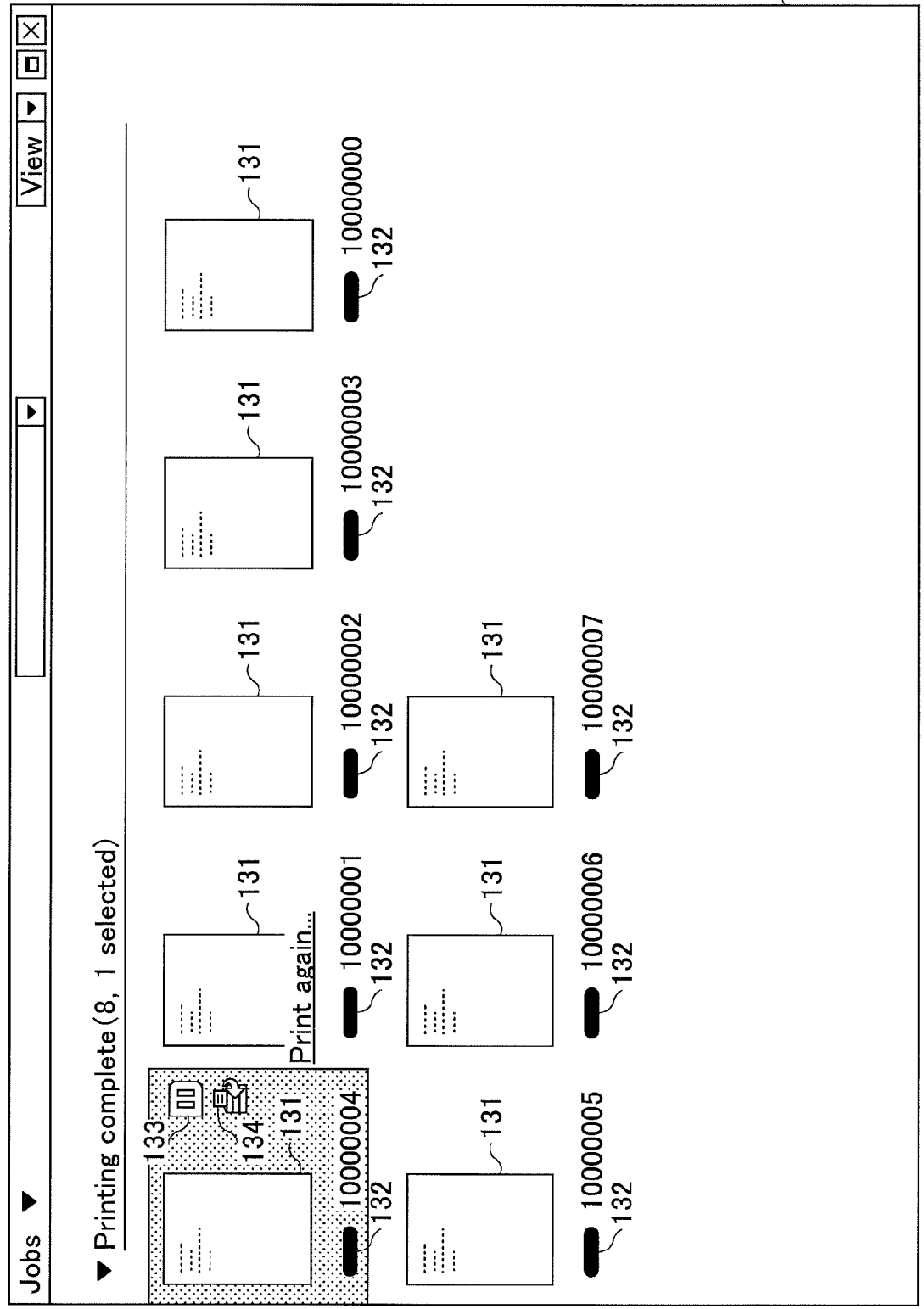

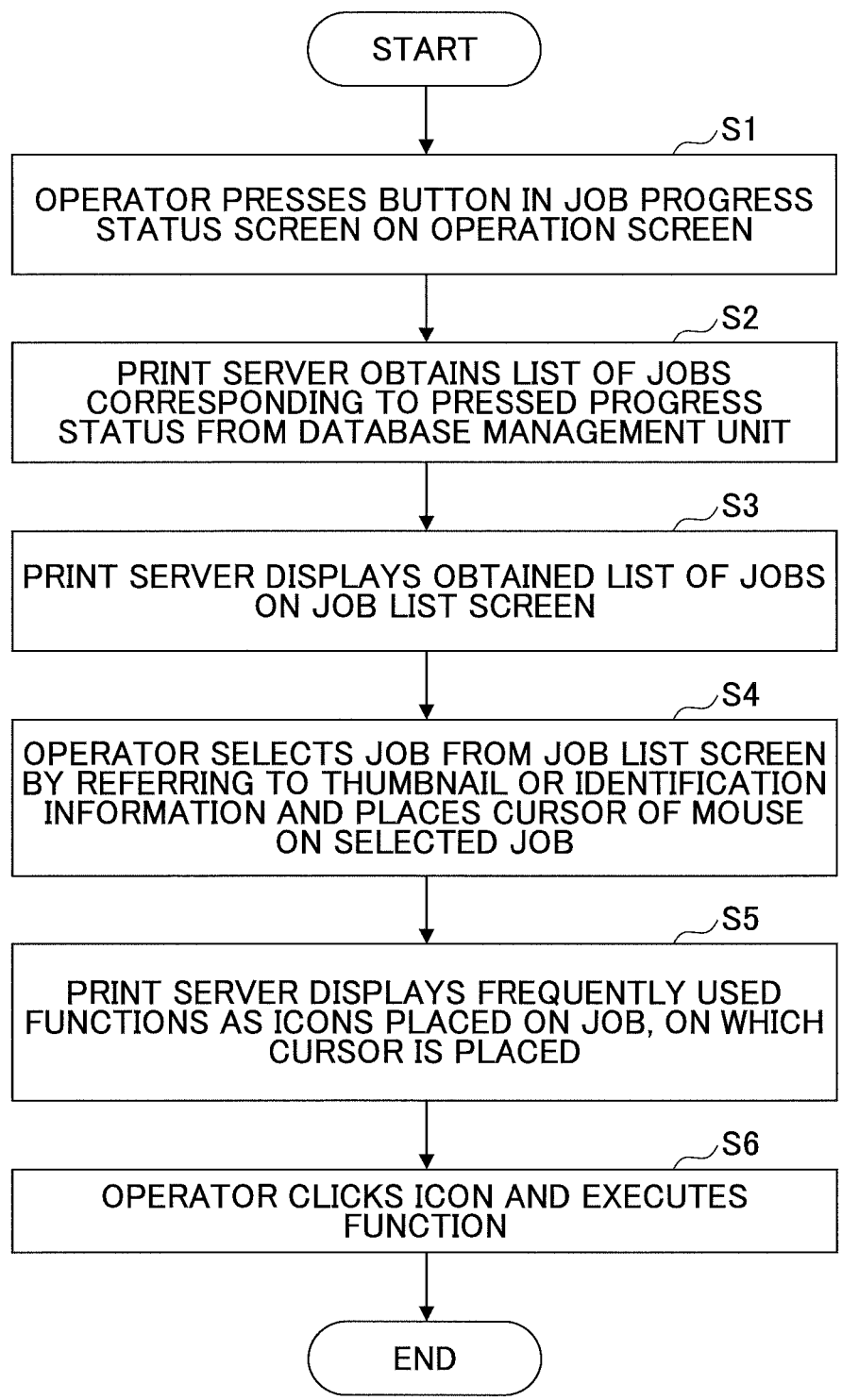

NON-TRANSITORY COMPUTER READABLE RECORDING MEDIUM STORING PRINT MANAGEMENT PROGRAM, PRINT MANAGEMENT DEVICE, PRINT MANAGEMENT METHOD, AND PRINT SYSTEM CONFIGURED FOR CAUSING A COMPUTER TO FUNCTION AS A JOB PROGRESS STATUS DISPLAY UNIT

BACKGROUND OF THE INVENTION

1. Field of the Invention

An embodiment of the present invention relates to a print management program, a print management device, a print management method, and a print system for managing print jobs.

2. Description of the Related Art

In a commercial printing industry, a commercial print service provider receives a printed material (such as a catalog, or an advertisement) from a customer, the commercial print service provider produces a customer's desired printed output material from the printing material, and the commercial print service provider receives compensation in return for delivering the printed output material to the customer. The commercial print service provider produces the printed output material by performing plural processes including the reception of the printing material and the delivery of the printed output material. The processes from the reception of the printing material to the delivery of the printed output material include prepress processes, such as the reception of the printing material from the customer, a reception of printing conditions for a printed output material, a color correction, a layout modification, and a correction of a binding position; postpress processes, such as proof printing for the customer to confirm the result of the prepress processes, printing and subsequent binding, and pressure bonding; and the delivery of the printed output material to the customer. Here, the number of the processes between the reception of the printing material and the delivery of the printed output material varies depending on a customer's desired printing condition for the printed output material.

In a conventional commercial printing industry, a commercial print service provider tends to receive an order for printed materials that require mass printing from a customer, and the commercial print service provider responds to the mass printing of the printed materials by the above described processes. Further, for the printed materials that require the mass printing, there are many cases in which a printing condition on the printed materials from a customer is fixed. In the conventional commercial printing industry, the commercial print service provider performs the mass printing under a determined single printing condition. After completing the lot printing, the printing condition is altered, and the mass printing under the altered printing condition is performed again. Through such a print cycle, the customer's desired printed output material is produced.

In the above printing cycle, plural processes tend to occur, when the printing condition is altered. Therefore, when the printing condition is not altered, the commercial print service provider can perform continuous printing in an ongoing process. Thus the mass printing can be efficiently performed.

Recently, in the commercial printing industry, a so-called "print-on-demand (POD) market" is emerging, where relatively small lot of printed materials are delivered to a customer in a short delivery time. In the POD market, orders from plural customers tend to occur. Consequently, in the POD market, printed materials submitted to a commercial print service provider and printing conditions on printed output materials are diversified.

Further, recently, digital printing has been widely used, and a computer has been widely used for controlling processes for producing printed materials. For example, technologies are emerging, such as a workflow for submitting a printed material as electronic data through a network and for controlling the above described plural processes. For example, in the workflow, printing operations in the plural processes are defined using a job ticket, which is called "Job Definition Format (JDF)," and the printing operations are controlled by a printing system.

In accordance with such a change in the printing environment, commercial print service providers have been introducing the computer technologies into the printing systems, so as to produce printed materials, in response to receiving orders for the printed materials. On the other hand, the commercial service providers have been required to set up printing systems that can handle diversified printing conditions for the printed materials from customers. Further, in order to produce diversified printed materials desired by the customers, the commercial print service providers have been required to respond in a system aspect, such as introduction of plural printer devices and peripheral devices, as well as in a process aspect, such as modification of the above described plural processes in a relatively short cycle.

The commercial print service providers have been required to respond as described above. Additionally, the commercial print service providers may be required to improve operational efficiency so as to increase profit. Measures for improving the operational efficiency include simplification of the processes.

For example, the commercial print service providers are required to efficiently manage print jobs that are ordered day by day, and print the print jobs. However, as the number of the print jobs increases, it becomes difficult for the commercial print service providers to find a target print job among the massive amount of print jobs.

For example, a technology has been conventionally known such that, in an information processing system, an identification of an electronic document is indicated in a list of electronic documents or in a list of search results by displaying management information, an icon, or a thumbnail of the electronic document (e.g., Patent Document 1 (Japanese Published Unexamined Application No. 2005-275836)). Here, the information processing device may be a document management system, which includes a database of electronic documents, each of the electronic documents being associated with management information (such as a name of the electronic document, a file name, or a keyword), and which performs searching for information.

However, there is a problem that, when the target print job is searched for among the massive amount of print jobs, the commercial print service providers may be required to perform many operational steps, even if the commercial print service providers utilize the technology for indicating an identification of an electronic document in a list of electronic documents or in a list of search results by displaying management information, an icon, or a thumbnail of the electronic document.

For example, when a commercial print service provider searches for a target print job, the commercial print service provider specifies information, such as a keyword, included in the management information as a search condition and narrows down the number of the print jobs. Then the commercial print service provider may be required to select the target print job by observing the display of management information, icons, and/or thumbnails of electronic documents. Thus there is a problem that operability is low.

SUMMARY OF THE INVENTION

The embodiment of the present invention has been developed in view of the above problems. An objective of the embodiment is to provide a print management program, a print management device, a print management method, and a print system that facilitate searching for a target print job.

In one aspect, there is provided a non-transitory computer readable recording medium that stores a print management program causing a computer to function as a job progress status display unit that divides job progress statuses of a print job into plural categories and that displays plural of the categories so that each of the categories can be selected; and a job list display unit that selects and lists first print jobs in a first job progress status from a first table that stores job progress statuses of print jobs. The first job progress status is included in the divided job progress statuses and corresponds to one of the categories selected by the job progress status display unit. The job list display unit selects first functions corresponding to the first job progress status of the listed first print jobs from a second table that stores functions corresponding to the divided job progress statuses. Further, the job list display unit displays icons. Here, each of the icons accepts execution of corresponding one of the selected first functions.

In another aspect, there is provided a print management device including a job progress status display unit that divides job progress statuses of a print job into plural categories and that displays plural of the categories so that each of the categories can be selected; and a job list display unit that selects and lists first print jobs from a first table that stores job progress statuses of print jobs. The first job progress status is included in the divided job progress statuses and corresponds to one of the categories selected by the job progress status display unit. The job list display unit selects functions corresponding to the first job progress status of the listed first print jobs from a second table that stores functions corresponding to the divided job progress statuses. Further, the job list display unit displays icons, each of the icons being configured to accept execution of corresponding one of the selected functions.

In another aspect, there is provided a print management method executed by a computer. The method includes a job progress status display step for dividing job progress statuses of a print job into plural categories and for displaying plural of the categories so that each of the categories can be selected; and a job list display step including a step for selecting and listing first print jobs in a first job progress status from a first table that stores job progress statuses of print jobs. The first job progress status is included in the divided job progress statuses and corresponds to one of the categories selected by the job progress status display unit. Further, the job list display step includes a step for selecting first functions corresponding to the first job progress status of the listed first print jobs from a second table that stores functions corresponding to the divided job progress statuses, and a step for displaying icons, each of the icons being configured to accept execution of corresponding one of the selected first functions.

In another aspect, there is provided a print system including a print management device and printers. The print management device includes a job progress status display unit that divides job progress statuses of a print job into plural categories and that displays plural of the categories so that each of the categories can be selected; and a job list display unit that selects and lists first print jobs from a first table that stores job progress statuses of print jobs. The first job progress status is included in the divided job progress statuses and corresponds to one of the categories selected by the job progress status display unit. The print management device further includes a printer interface unit that controls communications between the print management device and the printers and that updates contents of the first table based on information received from the printers. The job list display unit selects functions corresponding to the first job progress status of the listed first print jobs from a second table that stores functions corresponding to the divided job progress statuses. Further, the job list display unit displays icons, each of the icons being configured to accept execution of corresponding one of the selected functions.

Further, a method, a device, a system, a computer program, a recording medium, and a data structure, to which a portion of the embodiment or an arbitrary combination of portions of the embodiment has been applied, may be effective as aspects of the embodiment.

According to the embodiment, a print management program, a print management device, a print management method, and a print system, which facilitate searching for a target print job, are obtained.

Other objects, features and advantages of the present invention will become more apparent from the following detailed description when read in conjunction with the accompanying drawings.

BRIEF DESCRIPTION OF THE DRAWINGS

FIG. 4 is a configuration diagram of an example of a print job table;

FIG. 5 is a configuration diagram of an example of a print schedule table;

FIG. 6 is a configuration diagram of an example of an icon table;

FIG. 10 is an image diagram of an example of a job list screen; and

FIG. 11 is a flowchart showing an example of an operating procedure, when an operator presses a button in the job progress status screen.

DETAILED DESCRIPTION OF THE PREFERRED EMBODIMENTS

Hereinafter, an embodiment of the present invention is explained by referring to accompanying figures.

Figure 1:
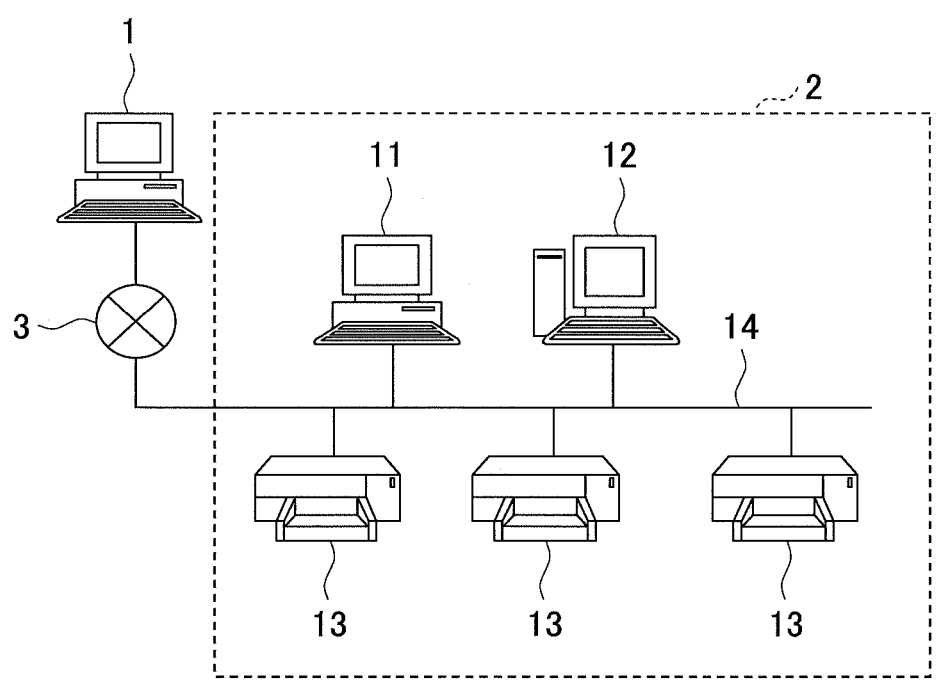
FIG. 1 is a system configuration diagram showing an example of a print system according to an embodiment of the present invention.

FIG. 1 is a system configuration diagram showing an example of a print system according to the embodiment. In the system shown in FIG. 1, a user client 1 and a print system 2 are connected through a network 3, such as the Internet. The user client 1 is a computer that is used by a customer for assigning a printing service to a commercial print service provider. The print system 2 is a system used by an operator of, for example, the commercial print service provider.

Further, the print system 2 includes a management client 11, a print server 12, one or more printers 13, and a network 14, such as a LAN. The management client 11, the print server 12, and the printers 13 are connected through the network 14.

The customer transmits a print job including a job ticket for a document to be printed and print data to the print server 12 by operating an application running on the user client 1. The management client 11 is a computer used by the operator of the commercial print service provider or the like for managing the assigned printing service.

The operator accesses a web user interface of the print server 12 from the management client 11 using an html browser. With this, the operator may, at least, search for a print job to be printed, start printing, cancel printing, delete the print job, and manage the print system 2. The print server 12 is an example of a print management device. The print server 12 causes the printer 13 to print the print job of the printing service assigned from the user client 1. Further, the print server 12 graphically displays, at least, operating conditions of the printers 13 in real time. Each of the printers 13 generates a print image from the print job in accordance with controlling of the print server 12, and prints the print image on a printing paper.

Figure 2:
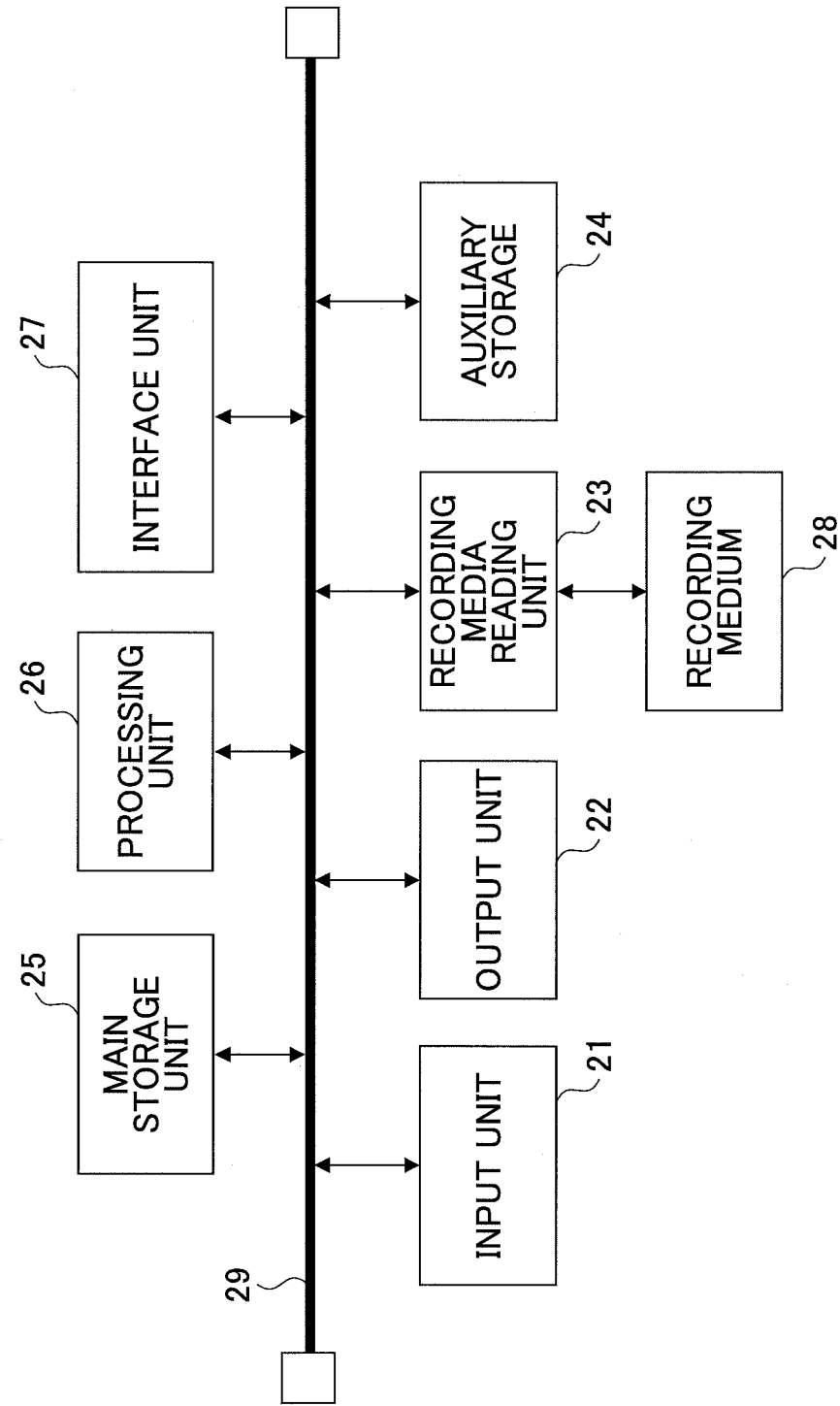
FIG. 2 is a hardware configuration diagram of an example of a personal computer.

The print server 12 is realized, for example, by a personal computer 20 (PC) having a hardware configuration shown in FIG. 2. FIG. 2 is a hardware configuration diagram of the example of the PC 20. The PC 20 includes an input unit 21, an output unit 22, a recording media reading unit 23, an auxiliary storage unit 24, a main storage unit 25, a processing unit 26, and an interface unit 27. The above elements of the PC 20 are mutually connected through a bus 29.

The input unit 21 is, for example, a keyboard and a mouse. The input unit 21 is used for inputting various signals. The output unit 22 is, for example, a display device. The output unit 22 is used for displaying various windows and data. The interface unit 27 is, for example, a modem or a LAN card. The interface unit 27 is used for connecting the PC 20 to the network 14.

A print management program installed on the print server 12 is at least a portion of various programs for controlling the PC 20. The print management program is, for example, distributed as a recording medium 28, or downloaded from the network 14.

As the recording medium 28, various types of recording mediums may be utilized. For example, as the recording medium 28, a recording medium, such as a CD-ROM, a flexible disk, or a magnetic optical disk, may be utilized. In such a recording medium, information is optically, electrically, or magnetically recorded. Further, as the recording medium 28, a semiconductor memory, such as a ROM, or a flash memory, may be utilized. In such a semiconductor memory, information is electrically recorded.

When the recording medium 28, in which the print management program is recorded, is set up in the recording media reading unit 23, the management program is installed onto the auxiliary storage unit 24 from the recording medium 28 through the recording media reading unit 23. Alternatively or additionally, the print management program may be downloaded from the network 14 or the like, and installed onto the auxiliary storage unit 24 through the interface device 27.

The auxiliary storage unit 24 stores the installed print management program, necessary files, and data. When the print management program is executed, the main storage unit 25 retrieves the print management program from the auxiliary storage unit 24 and stores the print management program therein. Then the processing unit 26 executes various processes (described later) in accordance with the print management program stored in the main storage unit 25.

Figure 3:
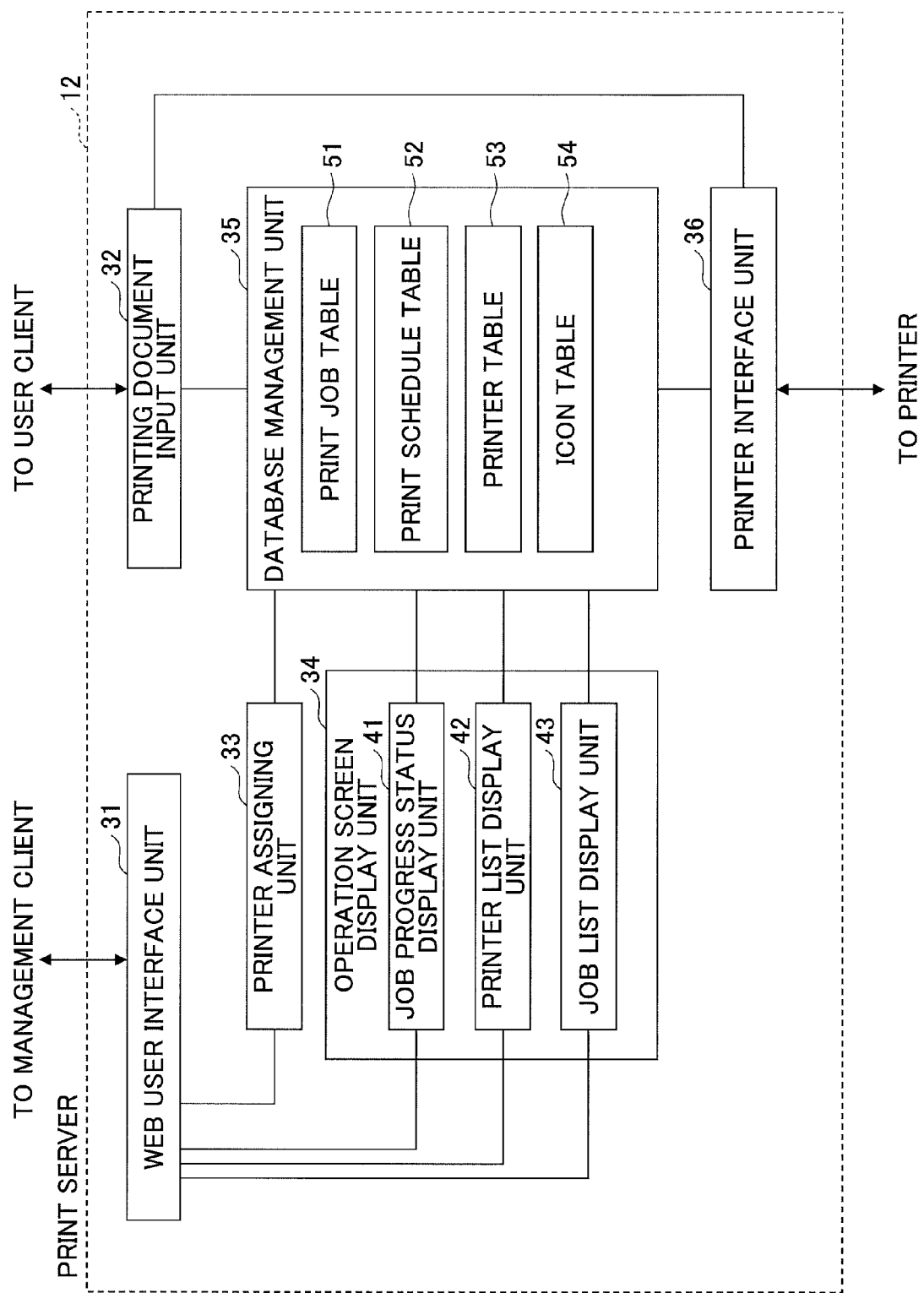
FIG. 3 is a functional block diagram of an example of a print server.

The print server 12 includes, for example, functional blocks shown in FIG. 3. FIG. 3 is a functional block diagram of an example of the print server 12. The print management program is installed on the print server 12. By executing the print management program, the print server 12 realizes a web user interface unit 31, a printing document input unit 32, a printer assigning unit 33, an operation screen display unit 34, a database management unit 35, and a printer interface unit 36.

The web user interface unit 31 is an interface that controls communications between the print server 12 and the management client 11. The web user interface unit 31 receives requests, such as a request of searching for a document to be printed, a request for starting printing, a request for canceling printing, a request for deleting a print job, and a request for managing the print system 2, from the management client 11.

The printing document input unit 32 receives a print job including a job ticket and print data of a document to be printed from the user client 1. The printing document input unit 32 registers the information of the received print job in the database management unit 35. After the information of the print job has been registered in the database management unit 35, the print job is scheduled on the printer 13 as described later, and the scheduled printer 13 executes printing of the print job.

The database management unit 35 includes, for example, a print job table 51, a print schedule table 52, a printer table 53, and an icon table 54. When the database management unit 35 receives a request from the printing document input unit 32, the printer assigning unit 33, or the printer interface unit 36, the database management unit 35 writes information in the print job table 51, the print schedule table 52, and the printer table 53.

The print job table 51 is a table for holding information of the print job received from the user client 1. Details of the print job table 51 are described later. The print schedule table 52 is a table for holding, at least, the information about the printers 13 which will print the corresponding print jobs, the information of the print jobs being held in the print job table 51, and current status information of the print jobs. Details of the print schedule table 52 are explained later.

The printer table 53 is a table for holding, at least, information about IP addresses in regard to connections of the printers 13, and status information of the printers 13. The icon table 54 is a table for holding icons that indicate functions corresponding to a status of the print job. Details of the icon table 54 are explained later.

The printer interface unit 36 controls communications between the print server 12 and the printers 13. Each time the printer 13 notifies a completion of a print job to the printer interface unit 36, the printer interface unit 36 refers to the print schedule table 52 and searches for a print job to be printed subsequently. When the printer interface unit 36 finds the print job to be printed subsequently, the printer interface unit 36 obtains details of the print job from the print job table 51. Based on the obtained details of the print job, the printer interface unit 36 transmits the print job held by the printing document input unit 32 to the printer 13.

Further, the printer interface unit 36 receives status information that is transmitted from the printers 13 every predetermined time interval. When the status of one of the printers 13 is changed, the printer interface unit 36 causes the database management unit 35 to update the status information of the printer 13 held by the printer table 53. Further, the printer interface unit 36 detects statuses of the print jobs based on the statuses of the corresponding printers 13, and the printer interface unit 36 causes the database management unit 35 to update the status information of the print jobs held by the print schedule table 52.

The printer assigning unit 33 is responsible for assigning a print job to one of the printers 13. The printer assigning unit 33 assigns a print job to one of the printers 13 automatically or manually, based on an attribute of the print job and attributes of the printers 13.

The operation screen display unit 34 is responsible for displaying an operation screen 100 for an operator. The operation screen display unit 34 displays the operation screen 100 described later. The operation screen display unit 34 includes a job progress status display unit 41, a printer list display unit 42, and a job list display unit 43.

The job progress level display unit 41 reads out relevant items in the tables included in the database management unit 35, and displays a job progress status screen 101 (described later). The printer list display unit 42 reads out relevant items in the tables included in the database management unit 35, and displays a printer list screen 102 (described later). The job list display unit 43 reads out relevant items in the tables included in the database management unit 35, and displays a job list screen 103 (described later).

FIG. 4 is a configuration diagram of an example of the print job table 51. The print job table 51 includes items whose contents correspond to a job ID, a job name, the number of copies, presence or absence of duplex printing, a printing paper for the job, an output location of the job, the number and positions of punched holes, a printer to be requested for printing, positions and the number of portions to be stapled, a retention period of the job, a customer name for the job, a description of the job, a data format of the input file, a size of the input file, the number of pages for the job, the number of sheets for the job, the number of pages that have already been output on the stacker, the number of sheets that have already been output on the stacker, the number of copies that have already been output on the stacker, the number of pages that have already been output on the stacker including pages that have been reprinted, the number of sheets that have already been output on the stacker including sheets that have been reprinted, date and time that the printer received the job, a size of the job, the number of times of reprinting for the job, date and time that the job was submitted, a range of pages to be printed, information about folding specified by the job, and information about binding specified by the job, respectively.

FIG. 5 is a configuration diagram of an example of the print schedule table 52. The print schedule table 52 includes items whose contents correspond to a job ID, a status of the job, a progress status of the job, a reason for waiting, the printer that is actually assigned, the printers that are scheduled to print, and an order of printing, respectively.

FIG. 6 is a configuration diagram of an example of the icon table 54. The icon table 54 includes items whose contents correspond to a status of the job, a progress status of the job, available functions (reprint, restart, stop, and move), and icons indicating functions, respectively.

Figure 7:
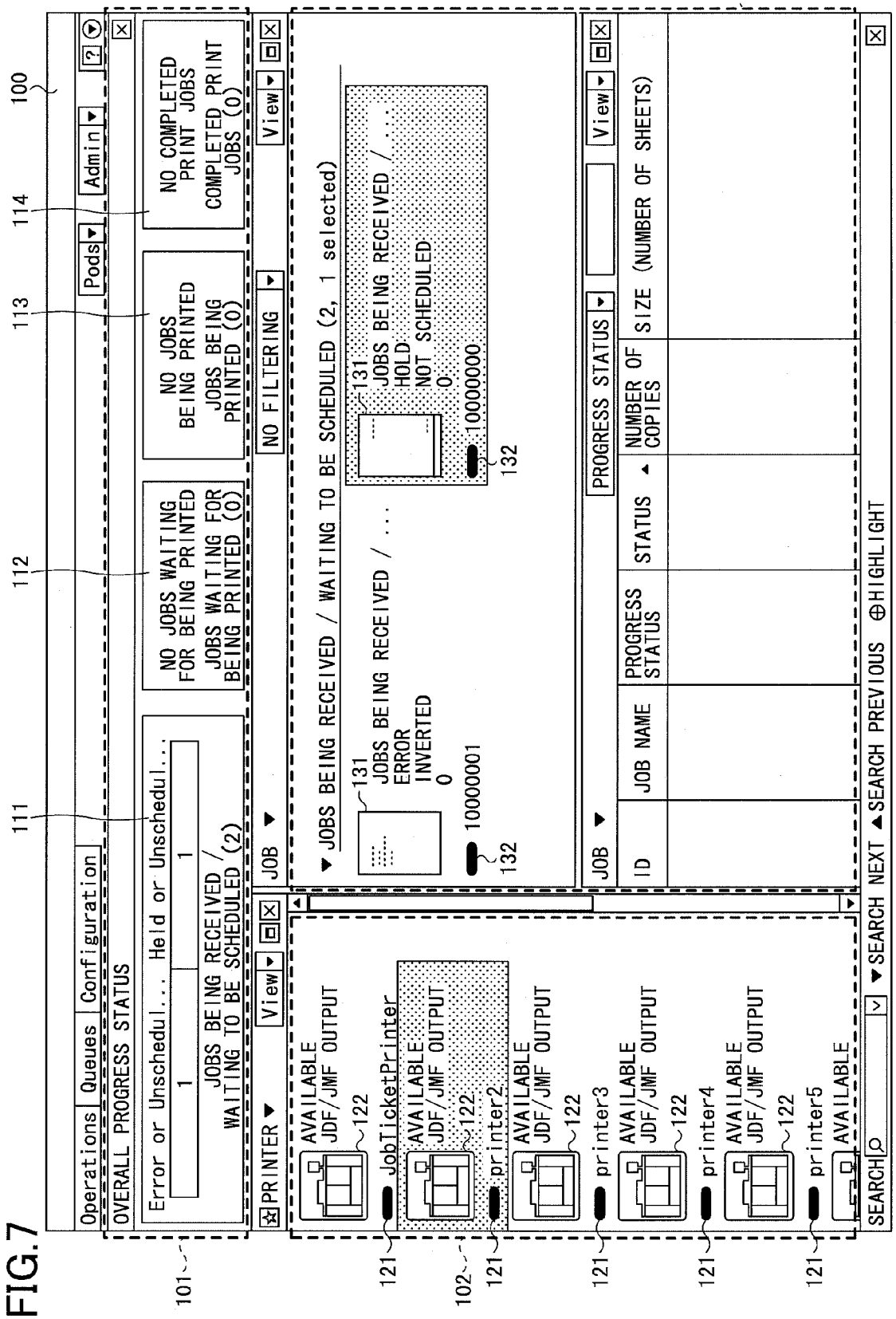
FIG. 7 is an image diagram of an example of an operation screen.

FIG. 7 is an image diagram of an example of the operation screen 100. The operation screen 100 includes the job progress status screen 101, the printer list screen 102, and the job list screen 103. The job progress status screen 101 displays print jobs that exist on the print system 2 and outlines of the progress statuses of the print jobs.

The job progress status screen 101 displays buttons 111-114 (status bars) corresponding to categories indicating progress statuses of print jobs. The button 111 indicates a category, "jobs being received/waiting to be scheduled." The button 112 indicates a category, "jobs waiting for being printed." The button 113 indicates a category, "jobs being printed." The button 113 indicates a category, "completed print jobs."

Each of the buttons 111-114 separately displays groups of print jobs using bars (e.g., a bar chart with colors). Here, the groups of the printed jobs are in different statuses, respectively, and the different statuses are included in the category, which corresponds to the button. The colors of the bars indicate the corresponding status as follows. For example, green indicates "normal," blue indicates "hold," and red indicates "error." Here, "hold" means operator's intentional holding. When the bar is clicked, the job list screen 103 is displayed in the operation screen 100. The job list screen 103 displays a list of print jobs that are included in the category corresponding to the clicked bar.

When there is no print job within one of the categories, the bar is not displayed for the category. Thus, it is not possible to click the bar in this case. The buttons 112-114 in FIG. 7 exemplify a case that there is no print job within a category. Within each of the bars, the number of print jobs that are in the status indicated by the bar is displayed. When there are plural print jobs in different statuses within one category, the bars are displayed in plural colors (e.g., two colors, or three colors) corresponding to the statuses. A display area of each of the bars displayed in the corresponding color varies depending on a ratio of the number of the print jobs corresponding to the bar to the total number of the print jobs included in the corresponding category. The button 111 is an example that one print job in the status of "error" and one print job in the status of "hold" are included in one category. The number of the print jobs in the category "completed print jobs" may be, for example, automatically reduced when a predetermined time interval has elapsed after the print job was completed. Alternatively, the number of the print jobs in the category "completed print jobs" may be manually reduced by an operator when the predetermined time interval has elapsed after the print job was completed.

The printer list screen 102 displays information about the printers 13 registered in the print system 2. In the printer list screen 102, a status of each of the printers 13 is displayed by a color of a bar 121. The colors of the bars 121 indicate the corresponding statuses as follows. For example, green indicates "available," blue indicates "unavailable," and red indicates "error." When, for example, an icon 122 of one of the printers 13 in the printer list screen 102 is clicked, the job list screen 103 is displayed in the operation screen 100. The job list screen 103 displays a list of print jobs that are scheduled to be printed by the printer 13.

The job list screen 103 displays the list of the print jobs. The job list screen 103 in FIG. 7 is an example in which the button 111 corresponding to the category "jobs being received/waiting to be scheduled" is clicked. The job list screen 103 graphically displays the list of the print jobs. The job list screen 103 displays, for each print job, a thumbnail 131 of the print job and a bar 132 indicating a status of the print job. The colors of the bar 132 indicate the corresponding statuses of the print job as follows. For example, green indicates "normal," blue indicates "hold," and red indicates "error."

Figure 8:
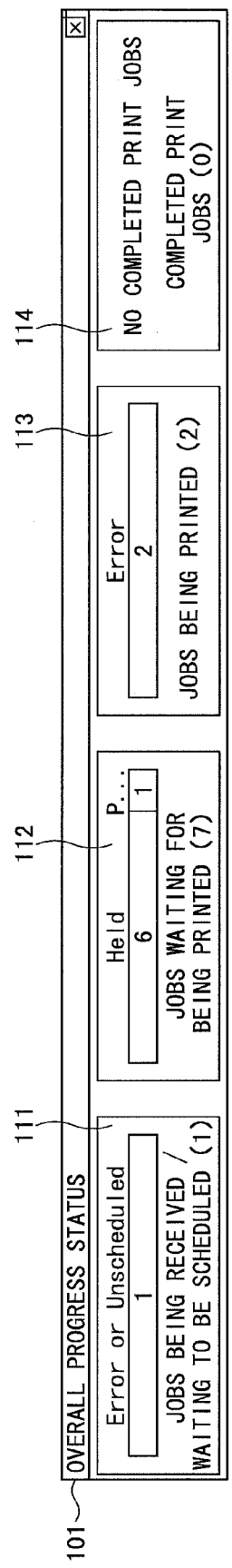
FIG. 8 is an image diagram of an example of a job progress status screen.

FIG. 8 is an image diagram of another example of the job progress status screen 101. The button 111 shows an example that one print job in the status of "error" is included in the category "jobs being received/waiting to be scheduled." The button 112 shows an example that six print jobs in the status of "hold" and one print job in the status of "error" are included in the category "jobs waiting for being printed." The button 113 shows an example that two print jobs in the status of "error" are included in the category "jobs being printed." The button 114 shows an example that there is no print job included in the category "completed print jobs."

Figure 9:
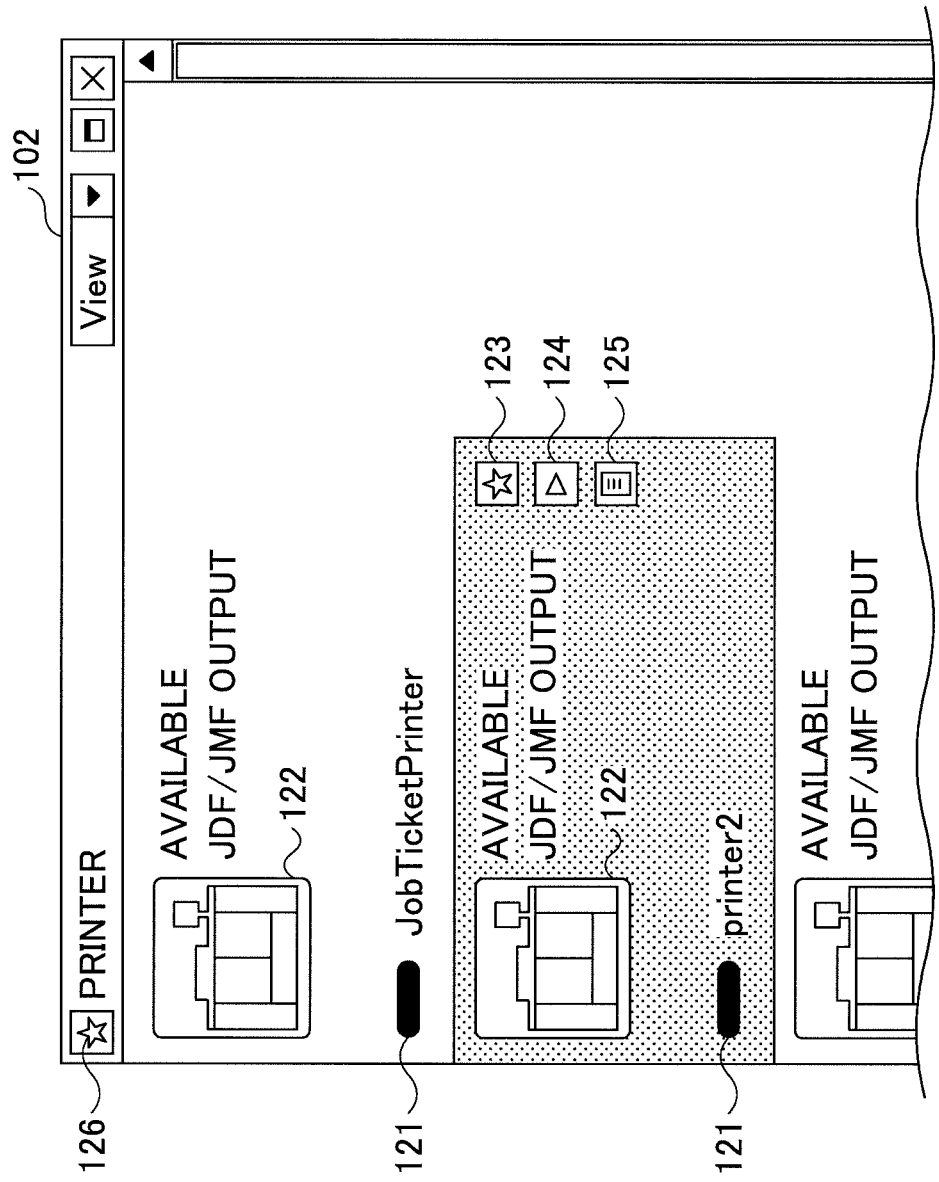
FIG. 9 is an image diagram of an example of a printer list screen.

FIG. 9 is an image diagram of another example of the printer list screen 102. The printer list screen 102 of FIG. 9 displays a favorite button 123, an available/unavailable toggle button 124, and a print job display button 125 as simplified action buttons, in addition to the information about the printers 13 displayed on the printer list screen 102 of FIG. 7.

The favorite button 123 is a button for registering or removing the corresponding printer 13 as a favorite printer. The available/unavailable toggle button 124 is a button for setting the printer 13 to be available or to be unavailable. The print job display button 125 is a button for displaying a list of print jobs scheduled to be printed by the corresponding printer 13. By clicking a button 126 for displaying only the favorite printers, the printers 13 registered as the favorite printers can be selected and displayed on the printer list screen 102.

FIG. 10 is an image diagram of another example of the job list screen 103. Similar to the job list screen 103 of FIG. 7, the job list screen 103 of FIG. 10 displays, for each print job, the thumbnail 131 of the print job and the bar 132 indicating the status of the print job. The job list screen 103 displays the simplified action buttons for the selected print job.

The simplified action buttons of FIG. 10 include a hold/release toggle button 133 and a reprint button 134. The hold/release toggle button 133 is a button for holding or releasing the print job. The reprint button 134 is a button for reprinting the print job. The simplified action buttons of FIG. 10 are buttons for executing functions corresponding to the status of the print job. The number of the simplified action buttons and the types of the simplified action buttons are varied depending on the status of the print job.

FIG. 11 is a flowchart showing an example of an operating procedure when an operator presses a button in the job progress status screen 101. Here, it is assumed that the print server 12 is displaying, for example, the operation screen 100 shown in FIG. 7. At step S1, the operator operates the management client 11 and presses, for example, the button 111 in the job progress status screen 101. The web user interface unit 31 accepts, for example, pressing of the button 111 with respect to the job progress status screen 101 from the management client 11.

After the web user interface unit 31 has accepted the pressing of the button 111, the job list display unit 43 obtains, at step S2, a list of print jobs included in the category "jobs being received/waiting to be scheduled" corresponding to the button 111 from the database management unit 35. For example, the job list display unit 43 can retrieve the list of the print jobs included in the category "jobs being received/waiting to be scheduled" by referring to the job progress statuses in the print schedule table 52.

The job list display unit 43 displays, at step S3, the obtained list of the print jobs on the job list screen 103. At step S4, the operator operates the management client 11 and selects a print job on the job list screen 103 by referring to identification information of the print job, such as the thumbnail 131 or a job name. Then the operator places a cursor of a mouse on the selected print job.

At step S5, the job list display unit 43 obtains icons corresponding to a status of the print job from the icon table 54 as the simplified action buttons of the print job. Here, the cursor of the mouse has been placed on the print job by the operator. Then the job list display unit 43 displays the obtained icons. For example, the job list display unit 43 can retrieve the simplified action buttons (the icons) from the icon table 54 using the status or the progress status of the print job as a key.

The operator can execute, at step S6, a process (function) corresponding to the status of the print job by operating the management client 11 and by clicking one of the simplified action buttons (one of the icons). After the process corresponding to the status of the print job has been executed, the job list display unit 43 causes the result of the execution of the process to be reflected in the tables included in the database management unit 35.

Since the print system according to the embodiment has, at least, the characteristics described below, when a print job is retrieved and displayed and an operation related to the print job is performed, an operator can retrieve and display the target print job and execute the operation related to the target print job with a reduced number of operations.

In the print system according to the embodiment, since a list of print jobs in a progress status that the operator desires to operate can be immediately retrieved and displayed on the job list screen 103 from the job progress status screen 101, the retrieval effectiveness is improved. Further, in the print system according to the embodiment, a list of print jobs to be printed by one of the printers 13 is immediately retrieved and displayed from the printer list screen 102, the retrieval effectiveness is improved. Further, in the print system according to the embodiment, a function corresponding to a status of a print job can be easily executed by operating a simplified action button in the job list screen 103. Thus the function corresponding to the status of the print job can be easily executed by the reduced number of operations.

Namely, in the print system according to the embodiment, a list of print jobs can be retrieved and displayed by one action from the job progress status screen 101 or from the printer list screen 102. Here, the list of print jobs corresponds to, for example, print jobs in a progress status that an operator desires to operate or print jobs scheduled to be printed by one of the printers 13 selected by the operator. Further, in the print system according to the embodiment, for a print job that has been retrieved and displayed, a function corresponding to a status of the print job can be executed by one action, namely, by pressing one of the simplified action buttons.

The present invention is not limited to the specifically disclosed embodiments, and variations and modifications may be made without departing from the scope of the present invention.

The present application is based on Japanese Priority Application No. 2011-042163 filed on Feb. 28, 2011, the entire contents of which are hereby incorporated herein by reference.

What is claimed is:

1. A non-transitory computer readable recording medium that stores a print management program causing a computer to function as:

a job progress status display unit configured to divide job progress statuses of a print job into plural categories and configured to display plural of the categories so that each of the categories can be selected; and a job list display unit configured to select and list first print jobs in a first job progress status from a first table configured to store job progress statuses of print jobs, wherein the first job progress status is included in the divided job progress statuses and corresponds to one of the categories selected by the job progress status display unit, wherein the job list display unit is configured to select first functions corresponding to the first job progress status of the listed first print jobs from a second table configured to store functions corresponding to the divided job progress statuses, wherein the job list display unit is configured to display icons, each of the icons being configured to accept execution of corresponding one of the selected first functions, wherein the job progress status display unit is configured to display buttons corresponding to the categories, and each of the buttons is displayed in a color corresponding to a job progress status of print jobs included in the category corresponding to the button, wherein when there are plural print jobs in different job progress statuses within one of the categories, the job progress status display unit is configured to display plural bars corresponding to the different job progress statuses within the button corresponding to the category, plural of the bars being displayed in different colors corresponding to the different job progress statuses, and wherein the job progress status display unit is configured to vary a display area of each of the bars displayed in the corresponding color in accordance with a ratio of number of the print jobs corresponding to the bar to total number of the print jobs included in the category.

2. The non-transitory computer readable recording medium according to claim 1, wherein the print management program further causing the computer to function as a printer list display unit configured to list printers so that each of the printers can be selected, wherein the job list display unit is configured to select and list second print jobs scheduled to be printed by the selected printer from the first table, the first table being further configured to store print jobs scheduled to be printed by the printers, wherein the job list display unit is configured to select second functions corresponding to a second job progress status of the listed second print jobs from a second table, and wherein the job list display unit is configured to display icons, each of the icons being configured to accept execution of corresponding one of the selected second functions.

3. The non-transitory computer readable recording medium according to claim 1, wherein the print management program further causing the computer to function as a printer list display unit configured to list printers so that each of the printers is selectable, wherein the printer list display unit is configured to display a button for registering and releasing one of the printers as a favorite printer, and wherein the printer list display unit is configured to switch between a list of the printers registered as the favorite printers and the list of the printers.

4. A print management device comprising:

a job progress status display unit configured to divide job progress statuses of a print job into plural categories and configured to display plural of the categories so that each of the categories can be selected; and a job list display unit configured to select and list first print jobs in a first job progress status from a first table configured to store job progress statuses of print jobs, wherein the first job progress status is included in the divided job progress statuses and corresponds to one of the categories selected by the job progress status display unit, wherein the job list display unit is configured to select functions corresponding to the first job progress status of the listed first print jobs from a second table configured to store functions corresponding to the divided job progress statuses, wherein the job list display unit is configured to display icons, each of the icons being configured to accept execution of corresponding one of the selected first functions, wherein the job progress status display unit is configured to display buttons corresponding to the categories, and each of the buttons is displayed in a color corresponding to a job progress status of print jobs included in the category corresponding to the button, wherein when there are plural print jobs in different job progress statuses within one of the categories, the job progress status display unit is configured to display plural bars corresponding to the different job progress statuses within the button corresponding to the category, plural of the bars being displayed in different colors corresponding to the different job progress statuses, and wherein the job progress status display unit is configured to vary a display area of each of the bars displayed in the corresponding color in accordance with a ratio of number of the print jobs corresponding to the bar to total number of the print jobs included in the category.

5. A print management method executed by a computer, the method comprising:

dividing job progress statuses of a print job into plural categories and displaying plural of the categories so that each of the categories is selectable; and selecting and listing first print jobs in a first job progress status from a first table configured to store job progress statuses of print jobs, wherein the first job progress status is included in the divided job progress statuses and corresponds to one of the selectable categories;

wherein the displaying of selectable categories includes selecting first functions corresponding to the first job progress status of the listed first print jobs from a second table configured to store functions corresponding to the divided job progress statuses, wherein the selecting and listing includes displaying icons, each of the icons being configured to accept execution of corresponding one of the selected first functions, wherein the displaying of selectable categories includes displaying display buttons corresponding to the categories, and each of the buttons is displayed in a color corresponding to a job progress status of print jobs included in the category corresponding to the button, wherein, when there are plural print jobs in different job progress statuses within one of the categories, the displaying of selectable categories includes displaying of plural bars corresponding to the different job progress statuses within the button corresponding to the category, plural of the bars being displayed in different colors corresponding to the different job progress statuses, and wherein the displaying of selectable categories includes varying a display area of each of the bars displayed in the corresponding color in accordance with a ratio of number of the print jobs corresponding to the bar to total number of the print jobs included in the category.

6. A print system including a print management device and printers, wherein the print management device comprising:

a job progress status display unit configured to divide job progress statuses of a print job into plural categories and configured to display plural of the categories so that each of the categories can be selected; and a job list display unit configured to select and list first print jobs in a first job progress status from a first table configured to store job progress statuses of print jobs, wherein the first job progress status is included in the divided job progress statuses and corresponds to one of the categories selected by the job progress status display unit; and a printer interface unit configured to control communications between the print management device and the printers and configured to update contents of the first table based on information received from the printers, wherein the job list display unit is configured to select first functions corresponding to the first job progress status of the listed first print jobs from a second table configured to store functions corresponding to the divided job progress statuses, wherein the job list display unit is configured to display icons, each of the icons being configured to accept execution of corresponding one of the selected first functions, wherein the job progress status display unit is configured to display buttons corresponding to the categories, and each of the buttons is displayed in a color corresponding to a job progress status of print jobs included in the category corresponding to the button, wherein when there are plural print jobs in different job progress statuses within one of the categories, the job progress status display unit is configured to display plural bars corresponding to the different job progress statuses within the button corresponding to the category, plural of the bars being displayed in different colors corresponding to the different job progress statuses, and wherein the job progress status display unit is configured to vary a display area of each of the bars displayed in the corresponding color in accordance with a ratio of number of the print jobs corresponding to the bar to total number of the print jobs included in the category.

* * * * *